United States Patent [19]

Painter

[11] Patent Number: 4,830,242
[45] Date of Patent: May 16, 1989

[54] TRAY APPARATUS FOR VEHICLES

[75] Inventor: Charles N. Painter, Box 4077C, New River Stage 1, Phoenix, Ariz. 85029

[73] Assignee: Charles N. Painter, Phoenix, Ariz.

[21] Appl. No.: 33,808

[22] Filed: Apr. 3, 1987

[51] Int. Cl.$^4$ ............................. B60R 9/00; B60R 5/04
[52] U.S. Cl. ................. 224/42.32; 224/42.42; 224/42.44; 296/26; 296/37.6
[58] Field of Search ............ 296/37.1, 37.5, 37.6, 296/37.16, 14, 22, 24 A, 26, 3, 100; 312/282; 224/42.42, 42.44, 42.32

[56] References Cited

U.S. PATENT DOCUMENTS

| | | | |
|---|---|---|---|
| 2,284,419 | 5/1942 | Greig | 296/26 |
| 2,486,966 | 11/1949 | Mitchell | 312/282 |
| 2,549,018 | 4/1951 | Sarlo | 296/26 |
| 2,784,027 | 3/1957 | Temp | 296/26 |
| 2,788,137 | 4/1957 | Harkness | 296/26 |
| 4,089,554 | 5/1978 | Myers | 296/24 A |
| 4,695,087 | 9/1987 | Hollrock | 296/100 |

FOREIGN PATENT DOCUMENTS 2701786 7/1978 Fed. Rep. of Germany ..... 296/37.1

Primary Examiner—Johnny D. Cherry
Assistant Examiner—Joseph D. Pape
Attorney, Agent, or Firm—H. Gordon Shields

[57] ABSTRACT

Tray apparatus designed for pickup trucks, vans, and similar vehicles includes a frame disposed on the bed of the vehicle and a tray movable within the frame from a nested or storage position within the frame to an open or outer position where the tray is disposed substantially outwardly from the pickup truck. The apparatus includes a wheel assembly for supporting the tray while the tray is moved outwardly and is in position. The apparatus also includes a plurality of compartments for storing various elements and folding sides providing utility space when the tray is in the open or outer position. No alteration of the vehicle is required.

27 Claims, 3 Drawing Sheets

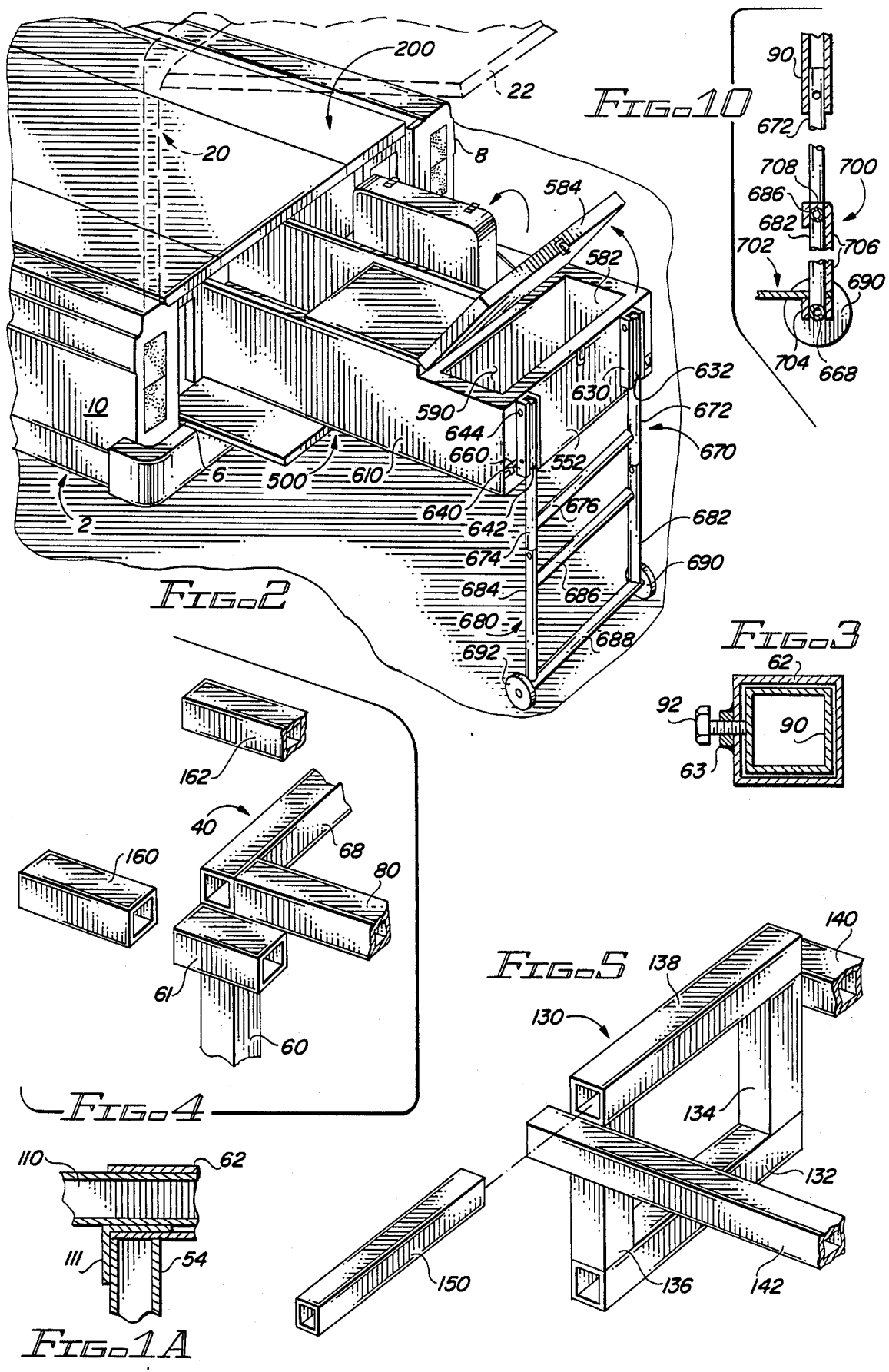

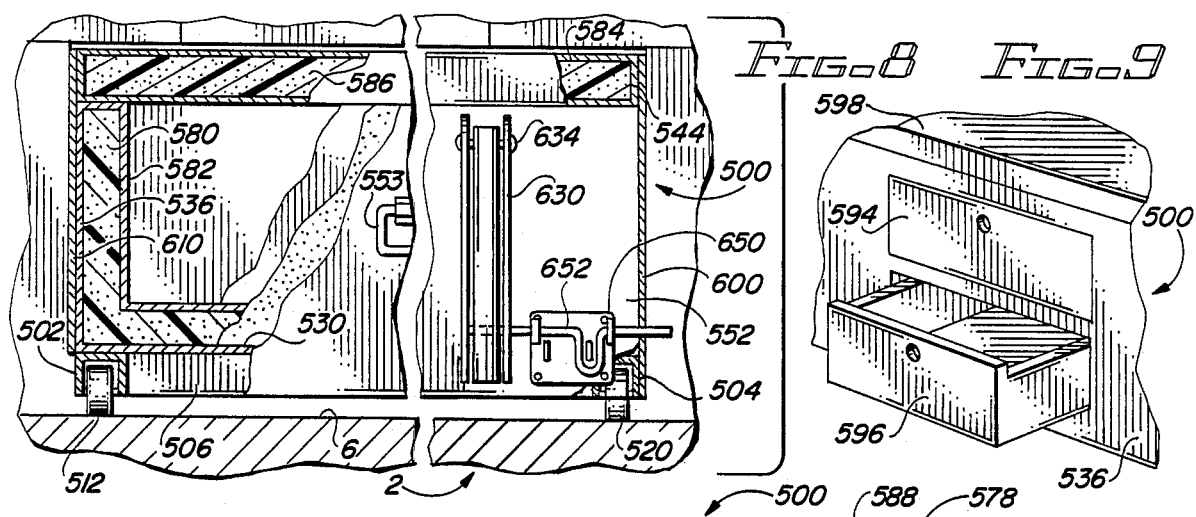
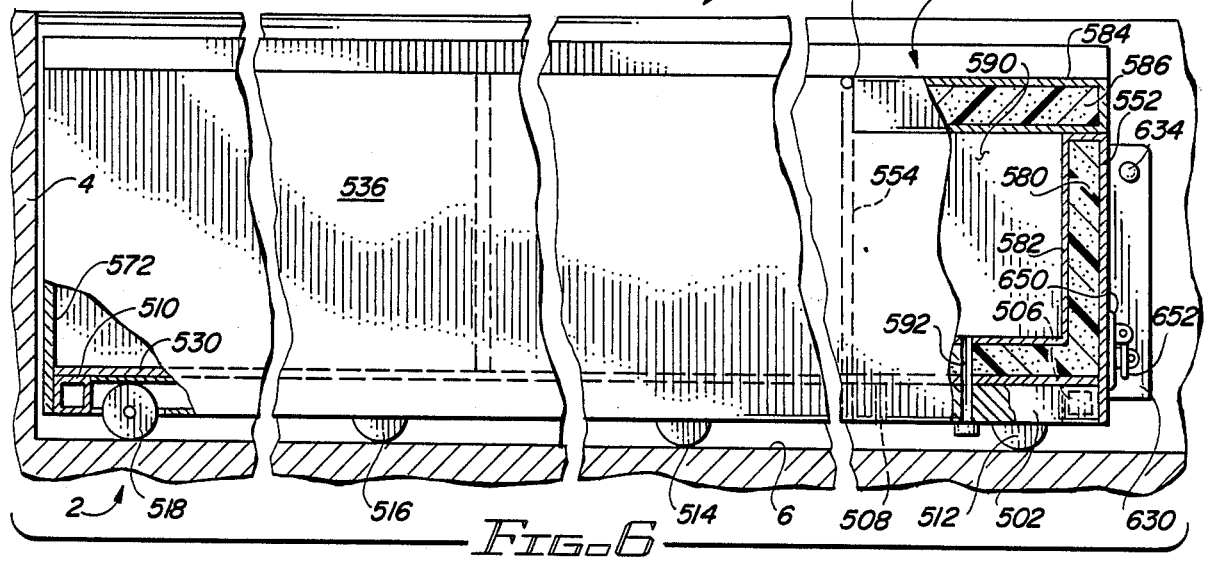
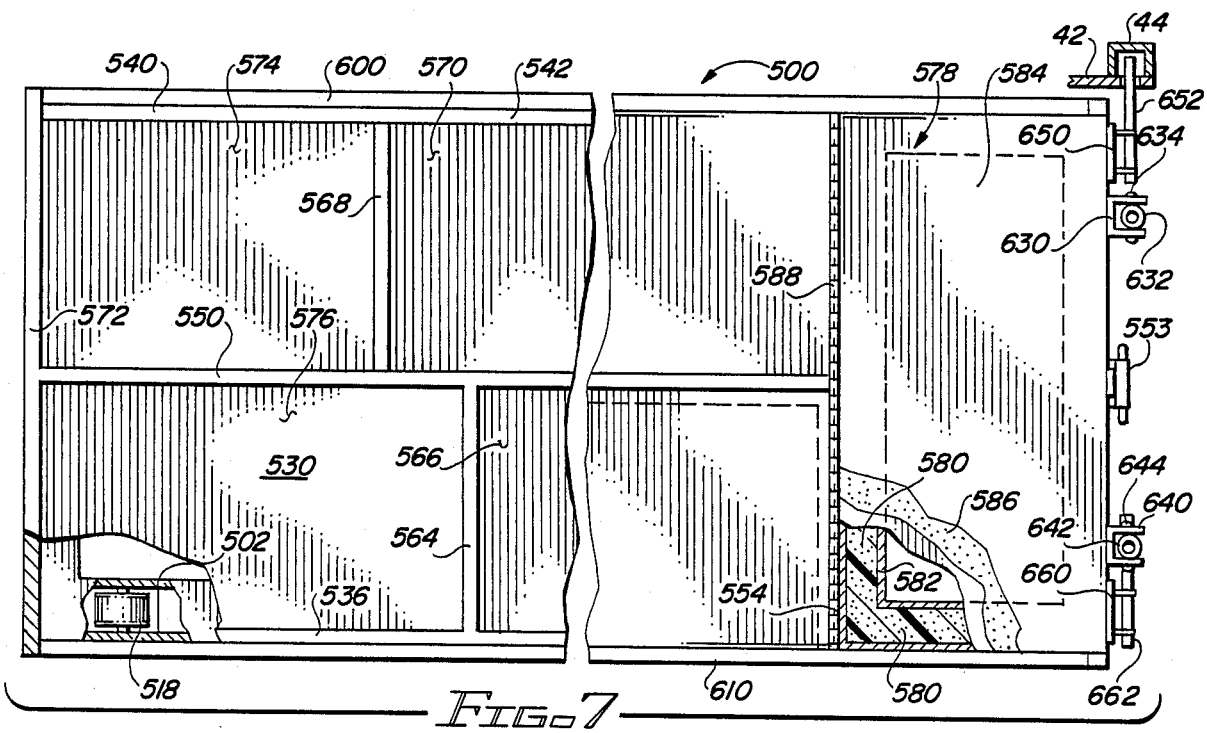

TRAY APPARATUS FOR VEHICLES

BACKGROUND OF THE INVENTION

1. Field of the Invention:

This invention relates to tray apparatus for vehicles, and, more particularly, to tray apparatus for pickup trucks, vans, and similar vehicles in which a tray is movable within a frame disposed on the vehicle bed.

2. Description of the Prior Art:

U.S. Pat. No. 1,279,635 (Belvel) discloses an extensible tray which slides outwardly from an automobile to provide a miniature truck attachment for an automobile.

U.S. Pat. No. 1,309,251 (Lakin) discloses a luggage carrier mounted on the back of a vehicle. The luggage carrier includes an extensible tray portion which telescopes relative to a fixed portion. The telescoping portion, when locked in place, comprises a pickup truck extension for a vehicle.

U.S. Pat. No. 2,110,944 (Schultz) discloses a combination trunk and trailer apparatus for an automobile. The trunk and trailer combination bolts to the rear of an automobile vehicle and opens up into two portions, which move relative to each other to comprise a trailer. The apparatus, in the open position, includes its own wheel and axle system.

U.S. Pat. No. 2,160,958 (Critchlow) discloses a table attachment for an automobile in which the tray attachment is disposed within the trunk of the vehicle, and which pivots outwardly from the trunk to comprise an exterior table secured to the vehicle. The tables moves on rollers and includes integral legs or support elements for supporting the outer end of the table remote from the vehicle.

U.S. Pat. No. 2,249,845 (Mitchell) discloses another folding table apparatus for an automotive vehicle. The table apparatus also includes fixed tracks which are secured within the trunk of a vehicle, and the table apparatus moves outwardly on the tracks. The apparatus includes integral legs for supporting the apparatus away from the vehicle and integral seats to allow users of the apparatus to be seated about the periphery of the table apparatus. The table includes two portions, on which folds or pivots relative to the other.

U.S. Pat. No. 2,284,419 (Grieg) discloses a type of carrying apparatus which moves outwardly from the trunk of a vehicle on a rail system. The rail system is secured to the sides of the vehicle trunk, and the carrying system, which comprises a box-like carrier, moves on the rails.

U.S. Pat. No. 2,490,014 (Brand) discloses a telescoping system secured to and within and against the trunk and frame of a vehicle and which moves outwardly from the vehicle for providing carrying space for carrying various elements. The telescoping portions include a wheel arrangement for supporting the extensible apparatus. The various telescoping sections nest within each other and may be moved outwardly any desired distance. The telescoping sections are locked in place by a pin system. The pin system is, of course, variable, so that the nesting sections may provide the desired total space.

U.S. Pat. No. 2,545,269 (Ford) discloses another extensible and nested system of drawers secured to the rear of a vehicle and nested within the trunk of a vehicle. The apparatus includes legs for supporting the apparatus in its open position.

U.S. Pat. No. 2,982,578 (Lowe) discloses a truck vehicle equipped with a cooking unit which rolls outwardly from the back of the truck. The rollout portion is supported on its own wheel assembly. The wheel assembly folds or pivots through a hydraulic jack system. The cooking unit comprises a tray which moves on a track system inwardly and outwardly. The tray moves also by virtue of a hydraulic system.

U.S. Pat. No. 3,132,755 (Greenslate) discloses a camp table which moves outwardly from the rear of a station wagon. The apparatus disclosed in this patent is more concerned with the structural elements involved in moving the table than in the table apparatus itself. That is, the apparatus described and claimed comprises the structural elements involved in moving the table inwardly and outwardly and supporting the table.

U.S. Pat. No. 3,338,620 (Cauvin) discloses a table panel which moves inwardly and outwardly from the rear of a station wagon type vehicle. The apparatus includes rollers and a track system in which the rollers move. The apparatus also includes pivoting leg support elements for the panel or table. Within the vehicle, the panel comprises the floor of the vehicle. Outwardly from the vehicle, it comprises a table, etc.

U.S. Pat. No. 3,829,064 (Jackson) discloses a winch system secured to a vehicle and which moves inwardly and outwardly on a track system. The winch may be disposed within the back of a vehicle for transport purposes, and may be moved outwardly for use purposes. The apparatus includes legs for supporting the winch outwardly from the vehicle.

U.S. Pat. No. 3,888,539 (Niessner) discloses a self-contained kitchen unit which moves outwardly from the back of a van. Within the self-contained kitchen unit are nested elements which move downwardly when the kitchen is outside of the van. The kitchen unit is thus completely enclosed when the unit is out of the vehicle. The apparatus uses rails for lateral movement inwardly to and outwardly from the van. Outwardly from the van, the kitchen unit also includes extensible legs. A winch system allows the nested elements to be moved upwardly and downwardly when the unit is out of the van.

U.S. Pat. No. 4,305,695 (Zachrich) discloses a rollout tray carried in the cargo area of a pickup truck. The apparatus includes a single leg which folds downwardly when the tray is in the outermost, or extended, position. The tray is compartmentalized. The sides of the tray are fixed in place. The tray rolls on fixed rollers secured to the floor of the pickup truck.

U.S. Pat. No. 4,518,189 (Belt) discloses a support bracket for supporting a cooking stove mounted in the back of a pickup truck. The bracket allows the stove to pivot away from the pickup truck for use, and, when the stove is folded, to be pivoted back onto the pickup truck for storage and for transportation.

Of the above-discussed patents, only U.S. Pat. No. 4,305,695 (Zachrich) patent deals with a compartmentalized tray usable with a pickup truck. Most of the other patents deal primarily with cargo carrying elements or related items. The Lowe patent discloses a tray system which moves outwardly from a truck, but the tray is for a specific purpose and accordingly includes specific elements, namely elements associated with a kitchen for catering purposes. All of the above-discussed patents require alteration or modification of the vehicle.

U.S. Pat. No. 3,132,755 (Greenslate) patent discloses a camp table, or rather structural elements associated with a camp table, which moves inwardly and outwardly from the rear of a vehicle. U.S. Pat. No. pv 3,338,620 pk (Cauvin) patent discloses a table which moves relative to the back of a pickup, and may be used for a number of purposes. U.S. Pat. No. pv 3,888,539 pk (Niessner) patent discloses a self-contained kitchen which moves into and out of the rear of an enclosed vehicle, and which includes nesting portions which move downwardly when the apparatus is outside of the vehicle. The apparatus is designed to be completely enclosed and to cooperate with an enclosed panel vehicle to provide totally enclosed space.

The apparatus of the present invention is designed to enhance the utilization of space in a pickup truck, van, or similar vehicle, for camping or related purposes by utilizing a compartmentalized tray within a frame disposed on the bed of the vehicle without altering the vehicle. The frame also supports a platform above the tray which may be used for sleeping purposes. The sides of the tray fold downwardly when the tray is away from the vehicle to provide utility work space.

SUMMARY OF THE INVENTION

The invention described and claimed herein comprises a frame and a tray movable within the frame in a vehicle, and the tray is compartmentalized to provide a plurality of compartments for cooking, storing, etc. The frame rests on the bed of the vehicle. The apparatus includes a leg and wheel assembly which provides support for the tray outwardly from the vehicle and when the tray is fully out and is moving outwardly and inwardly. The sides of the tray fold upwardly and downwardly, as desired. When the tray is out, the sides may be pivoted ninety degrees to provide utility work space, such as a table, a work counter, and the like. The frame comprises a virtually universal adapter enabling the tray apparatus to be used with most pickup trucks without modifying the trucks. The frame expands in two directions, longitudinally and laterally, as required. A platform is disposed on the frame.

Among the objects of the present invention are the following:

To provide new and useful tray apparatus;

To provide new and useful tray apparatus for the back of a vehicle;

To provide new and useful compartmentalized tray apparatus movable from a position within a vehicle to a position outside of a vehicle;

To provide new and useful tray and frame apparatus disposed on the bed of a vehicle without modifying the vehicle;

To provide new and useful tray and frame apparatus for a vehicle;

To provide new and useful frame apparatus supporting a platform and having storage space beneath the platform;

To provide new and useful multi-purpose wheel apparatus;

To provide new and useful frame apparatus and a tray movable within the frame into and out of an automotive vehicle; and To provide new and useful tray and frame apparatus for a vehicle in which the frame is disposed on the vehicle and the tray is movable relative to the frame.

BRIEF DESCRIPTION OF THE DRAWING

FIG. 1A is a view in partial section of a portion of the apparatus of the present invention.

FIG. 2 is a perspective view of a portion of the apparatus of the present invention in a use environment.

FIG. 3 is a view in partial section taken generally along line 3—3 of FIG. 1.

FIG. 4 is a perspective view of a portion of the apparatus of the present invention.

FIG. 5 is a perspective view of another portion of the apparatus of the present invention.

FIG. 6 is a side view of another portion of the apparatus of the present invention.

FIG. 7 is a top view of the apparatus of FIG. 6.

FIG. 8 is an end view in partial section, and partially cut away, of a portion of the apparatus of the present invention.

FIG. 9 is an enlarged perspective view of an alternate embodiment of a portion of the apparatus of the present invention.

FIG. 10 is a view in partial section of a portion of the apparatus of the present invention illustrating an alternate embodiment of a portion of the apparatus.

DESCRIPTION OF THE PREFERRED EMBODIMENT

Figure 1:
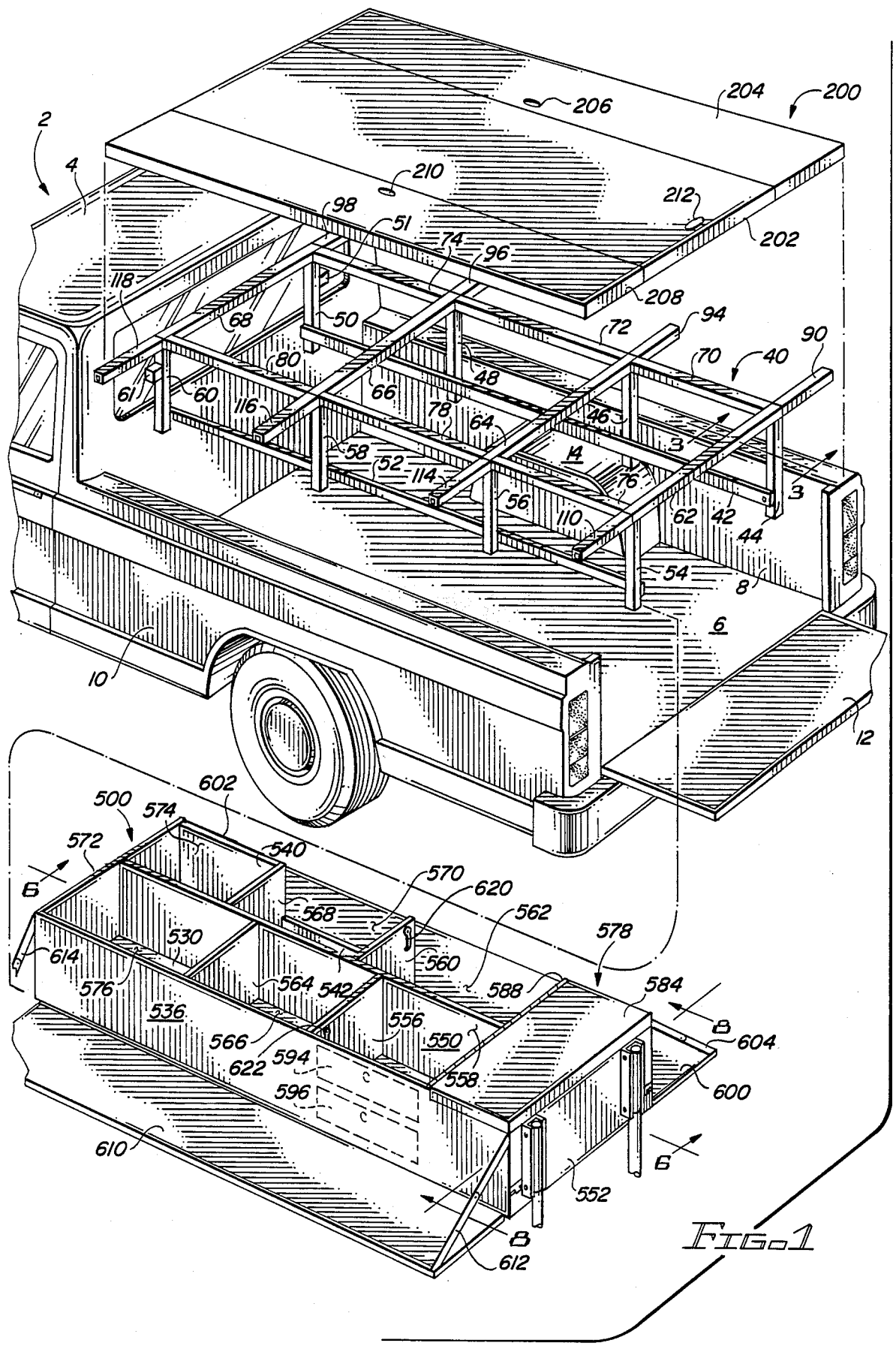
FIG. 1 is an exploded perspective view of the apparatus of the present invention.

FIG. 1 is a perspective view of a pickup truck 2 with the three general elements of the apparatus of the present invention shown spaced apart, in an exploded perspective view, to illustrate the general relationship among the elements. The pickup truck 2 includes a cab 4 and a bed 6 extending rearwardly from the cab. The pickup truck 2 includes a right side 8 and a left side 10, both of which extend rearwardly from the cab 4 and upwardly from the bed 6. At the rear of the truck is a tailgate 12. The tailgate 12 is shown in its down position. A wheelwell 14, the right side wheelwell, is shown extending inwardly from the right side 8 and upwardly from the bed 6. There is also a left side wheelwell, but it is not shown in the perspective view of FIG. 1.

A frame 40, one of the three primary components of the apparatus of the present invention, is shown spaced upwardly from the bed 6 of the pickup and within the sides 8 and 10. A second primary component, a movable tray 500, is shown out, away from the pickup. The tray 500 is disposed within the frame 40 and on the bed 6 of the pickup in its nested position, and moves outwardly from the pickup 2 to its outer position. This is best shown in FIG. 2.

FIG. 1A is an enlarged view in partial section of a portion of the frame 40, illustrating a feature of the frame.

FIG. 2 is a perspective view of the rear portion of the pickup truck 2, showing the tray apparatus 500 extending partially outwardly from the pickup truck 2. Also shown in FIG. 2, in phantom, is the outline of a shell 20 extending upwardly from the sides 8 and 10 of the pickup 2. The shell 20 includes a rear door 22, also shown in phantom, in its open position, pivoted upwardly with respect to the pickup 2 and the tray 500.

A platform 200 is the third primary component of the apparatus of the present invention. The platform 200 is shown in FIG. 1 spaced upwardly from the frame 40. In FIG. 2, the platform 200 is shown in its down, use position, disposed on the frame 40 and covering the top of the frame.

In the following discussion, the three primary elements of the apparatus of the present invention will be discussed individually, and specific reference to the drawings will be made as required. For the discussion of the frame 40, reference will be made primarily to FIG. 1.

The frame 40 is preferably made primarily of square steel tubing. The various tubing pieces are appropriately secured together, as by welding. For structural reinforcement, gussets or the like may be welded in place. However, for purposes of clarity the gussets are not shown in the drawing. Such elements are well known and understood in the art, and further explanation concerning them need not be given.

The frame 40 includes a base strap or stringer 42 which extends longitudinally with respect to the pickup truck bed 6. Extending upwardly from the base stringer 42 are four vertical posts, including a vertical post 44, a vertical post 46, a vertical post 48, and a vertical post 50. A square tubing socket 51 is shown extending horizontally and secured to the vertical post 50. The purpose of the socket 51 will be discussed in detail below.

A second base strap or stringer 52 is shown spaced apart from the base stringer 42. The base stringer 52 is generally parallel to the stringer 42 and accordingly extends longitudinally with respect to the bed 6 of the pickup truck 2. Extending upwardly from the base stringer 42 are also four vertical posts. The posts include a vertical post 54, a vertical post 56, a vertical post 58, and a vertical post 60. The vertical post 60 includes a horizontally extending socket 61, which is generally parallel to the socket 51. The sockets 51 and 61 are also preferably square steel tubing lengths.

The stringers 42 and 52 need not be tubing. They may simply be straps, as shown, to which the vertical posts are secured. Moreover, the stringers 42 and 52 may be spaced upwardly from the bottoms of the vertical posts, if desired.

Extending between and on top of the vertical posts 44 and 54 is a horizontal cross member 62. Extending between and on top of the vertical posts 46 and 56 is a horizontal cross member 64. Extending between and on top of the vertical posts 48 and 58 is a horizontal cross member 66. Extending between and on top of the vertical posts 50 and 60 is a horizontal cross member 68. The horizontal cross members 62, 64, 66, and 68 extend across the tops of their respective vertical members. The outer ends of the horizontal cross members receive side frame extensions, which will be discussed below.

A longitudinally extending frame member 70 extends between the outer ends of the horizontal cross members 62 and 64 at the upper portion of the posts 44 and 46. A longitudinally extending frame member 72 extends between the horizontal cross members 64 and 66 and at the upper end of the vertical posts 46 and 48. A longitudinally extending frame member 74 extends between the horizontal cross members 66 and 68 at the upper ends of the vertical posts 48 and 50.

Three other longitudinally extending frame members are also used. A longitudinally extending frame member 76 extends between the ends of the horizontal cross frame members 62 and 64 between the vertical posts 54 and 56. A longitudinally extending frame member 78 extends between the outer ends of the horizontal cross frame members 64 and 66 at the upper ends of the vertical posts 56 and 58, and a longitudinally extending frame member 80 extends between the outer ends of the horizontally extending cross frame members 66 and 68 at the upper ends of the vertical posts 58 and 60.

The frame members discussed above, including the base stringers 42 and 52, and ending with the horizontally extending frame member 80, define a base frame, or comprise the base frame, which is disposed within the pickup on the bed 60. The base frame may be appropriately configured to fit virtually any pickup truck, from short bed and narrow bed pickups to the longest bed and widest bed pickup trucks.

Appropriate side frame extension members extend outwardly from the horizontally extending cross members. The side frame extensions telescope into the cross members and their length is accordingly variable. Their length is adjusted to fit the width of the bed of the vehicle in which the frame 40 is disposed. After the side extensions are appropriately in place, the extensions are secured to the cross members as illustrated in FIG. 3, and as will be discussed in conjunction therewith.

It will be recalled that the various frame members are preferably square tubing. Accordingly, with the ends of the horizontally extending cross frame members 62, 64, 66, and 68 open, horizontally extending side extension frame members may be inserted into the cross members to provide additional width for the base frame.

At the front of the frame 40, the sockets 51 and 61 also comprise square tubing to receive front frame extension elements for extending the length of the frame 40. Depending on the length of the front extension required, separate tubing elements, as shown in FIG. 4, and as discussed in conjunction therewith, may be used, or a front frame extension 130 may be used. The front frame extension 130 will be discussed in detail below in conjunction with FIG. 5.

At the rear of the frame 40 is a right side horizontally extending frame member 90. The horizontally extending frame member 90 is preferably made of square tubing. The frame member 90 extends into the square tubing 62. The length of the frame member 90 may be as desired to provide a maximum width expected for wide bed pickup trucks, and also it may be short enough to extend a minimum width for narrow bed pickups.

FIG. 3 is a view in partial section taken generally along line 3—3 of FIG. 1, through a portion of the frame member 62, showing the frame member 90 secured to the frame member 62.

The extension frame member 90 may be secured to the member 62 by the simple expedient of a hole drilled in the member 62, a nut 63 welded to the member 62 about the hole, and a screw (or bolt) 92 engaging the nut 63 and extending through the hole and against the member 90.

A horizontally extending frame extension member 94 extends outwardly from the cross member 64 at the juncture of the vertical post 46 and the longitudinally extending frame members 70 and 72. The length of the frame member 94 is comparable to the length of the frame member 90, so that it may be moved inwardly or outwardly with respect to the cross member 64 to accommodate different widths of pickups.

A third frame extension 96 extends outwardly from the frame member 66. The horizontally extending frame member 96 is substantially identical to the frame members 90 and 94. The frame member 96 extends outwardly from the frame member 66 at the juncture of the vertical post 48 and the longitudinally extending frame members 72 and 74.

At the front of the frame 40 is a fourth horizontally extending side frame extension member 98. The frame member 98 is substantially identical to the frame members 90, 94, and 96. The horizontal frame member 98 extends into the horizontally extending cross member 68. The extension frame members 94, 96, and 98 are all secured in their respective member 64, 66, and 68 the same as the member 90 is secured in the member 62, as illustrated in FIG. 3.

On the opposite side of the frame 40 there are substantially identical, or mirror image, side frame extensions. At the rear of the frame 40 is a horizontally extending frame member 110. The horizontal frame member 110 extends into the outer end of the horizontal cross member 62. The frame member 110 is preferably secured to the frame member 62 as shown in FIG. 3.

Three more horizontally extending frame extension elements of members 114, 116, and 118 extend outwardly from the horizontal cross members 64, 66, and 68, respectively. The horizontally extending frame extension members 110, 114, 116, and 118 are movable in their respective horizontally or transversely extending cross frame members so that they may be extended to the appropriate distance to accommodate the frame 40 to any width pickup, as discussed above. The extension members are secured to their respective members as shown in FIG. 3 and as discussed above.

FIG. 1A is a view in partial section through the frame member 54 and the cross member 62 secured thereto. The horizontal extension member 110 is shown extending into the cross member 62. An arm portion of a bracket 111 is shown wedged beneath the member 110 and within the member 62. The bracket or shim 111 keeps the member 110 from sagging. Brackets or shims may be used in conjunction with all of the horizontal extension members.

FIG. 4 is a perspective view of a portion of the frame 40. A portion of the vertical frame member 60, the horizontally extending cross member 68, and the horizontally and longitudinally extending frame member 80 are shown. The frame members 60, 68, and 80 are shown at their juncture. The tubing portion 61, which comprises a socket, is shown secured to the vertical member 60. A length of square tubing comprising a front horizontal extension member 160 is shown spaced apart from the tubing or socket 61. A second horizontal (and longitudinal) extension 162 for the socket 51 (see FIG. 1) is also shown in FIG. 4.

When the length of the bed of the vehicle in which the frame 40 will be placed is only slightly longer than the frame 40, a pair of longitudinally extending frame extensins, such as the members 160 and 162 may be used with the sockets 51 and 61 (see FIG. 1). The member 160 and 162 may be secured to the sockets 51 and 61, respectively, as shown in FIG. 3.

To adapt the frame 40 to fit pickup beds of various lengths, there is a front frame extension 130, shown in FIG. 5. FIG. 5 is a perspective view of the front frame extension 130. The front frame extension 130 includes a bottom horizontally extending frame member 132 and a pair of vertically extending posts 134 and 136 appropriately secured to, and extending upwardly from, the outer ends of the horizontal and cross or transverse frame member 132. A top horizontal frame member 138 extends across the top of the vertical frame members 134 and 136. The frame members 132, 134, 136, and 138 are appropriately secured together, as by welding.

Extending longitudinally forwardly and rearwardly from the top of the vertical frame member 134 and 136, and below the top horizontally extending frame member 138, is pair of side rails. The side rails include a side rail 140, secured to the post 134, and a side rail 142 secured to the post 136. The side rails 140 and 142 are square tubing, and they extend into the square tubing sockets 51 and 61, respectively. The length of the side rails 140 and 142 is sufficient to allow the front frame extension 130 to be positioned appropriately for the length of virtually any pickup bed. The same type of locking system may be used to secure the rails 140 and 142 to their sockes 51 and 61, respectively, as is shown in FIG. 3.

The ends of the upper transverse or cross frame member 138 are open, as shown in FIG. 5, and additional side extension members may be appropriately telescopingly secured to the frame member 138. A front side extension 150 is shown in FIG. 5 spaced apart from the front frame extension 130. The side frame extension 150 may also be secured to the horizontally extending frame member 138 as shown in FIG. 3.

A side extension, not shown, substantially identical to the side extension 150, may also extend outwardly from the opposite end of the horizontal frame member 138. It will be noted that the side extension 150, and its opposite counterpart, not shown, are substantially identical to the eight side extensions 90, 94, 96, 98, and 110, 114, 116, and 118, previously discussed.

From the above discussion, and from reference to FIG. 1, it will be understood that the frame 40, with the base fixed frame consisting of the base stringers 42 and 52, the vertical posts, the horizontal cross members, and the longitudinal members, together with the front frame extension 130 and the various side frame extensions, comprises a frame which may be expanded longitudinally and laterally to accommodate pickup beds of various sizes, from the shortest and narrowest to the longest and widest. Moreover, the size and placement of the wheelwells in the pickup truck bed are virtually immaterial, so far as the frame 40 is concerned.

The platform apparatus 200 is shown in FIG. 1 spaced upwardly from the top of the frame 40. In FIG. 2, the platform 200 is shown disposed on the frame 40 within the bed of the pickup truck 2. The platform 200 shown in both FIGS. 1 and 2 is shown in its assembled state, extending fully from the front to the rear of the pickup truck bed 6 and extending for the full width of the pickup truck bed 6.

The platform 200 is shown in three separate pieces, all of which are generally elongated and are disposed on top of the frame 40. The three portions include a center portion 202, a right side portion 204, and a left side portion 208. The center portion 202 corresponds generally to the center portion of the frame 40, and the right and left portions 204 and 208 are generally correlated to the side portions of the frame 40.

About in the center of the right portion 204, from front to back, is a hand hold 206. Aligned with the hand hold 206 is a hand hold 210 in the left side portion 208. The hand holds 206 and 210 are used to raise or to remove the side portions 204 and 208, respectively, to provide access to the storage compartments defined beneath the side portions of the frame, and forwardly and rearwardly of the wheel wells. The hand holds are generally close to the center portion 202 for convenience.

A hand hold 212 is shown on the center portion 202 adjacent to its outer end. The hand hold is for convenience in moving the center portion 202.

Obviously, the overall length and width of the platform 200, including its three sections 202, 204, and 208, must be tailored for a particular vehicle with which the apparatus of the present invention will be used.

The platform 200 may be made of any appropriate material, such as plywood, aluminum, etc.

Beneath the platform 200, and within the frame 40, is the tray 500. The tray apparatus 500 moves inwardly and outwardly relative to the bed 6 of the vehicle 2, and relative to the frame 40 and the platform 200. When the tray apparatus 500 is disposed fully within the vehicle and within the frame 40 and beneath the platform 200, it is in its nested position. From the nested position, the tray apparatus 500 may be moved outwardly until it is supported on the outer end of the bed 6 of the vehicle, virtually on the tailgate 12, and supported on its own wheels, as will be discussed in detail below.

In FIG. 1, the tray apparatus 500 is shown separated from the truck 2 and from the frame 40 and the platform 200. The tray apparatus 500 is shown in FIG. 1 in its fully open position to provide not only access to all of the compartments in the tray apparatus, but also to provide work or eating space on opposite sides of the tray apparatus by means of a pair of side members which pivot ninety degrees to comprise table portions.

In FIG. 2, the tray apparatus 500 is shown partially out of the pickup truck 2, and disposed on its wheel assembly. FIG. 6 is a side view of the tray apparatus 500 illustrating various features of its construction. FIG. 7 is a top view of the tray apparatus 500, illustrating additional features of its construction. FIG. 8 is an end view, in partial section, and partially broken away, to illustrate additional features of the construction of the tray apparatus. FIG. 9 is a perspective view of a portion of the tray apparatus 500, showing an alternate embodiment thereof. For the following discussion of the tray apparatus 500, attention will be directed to FIGS. 1, 2, 6, 7, 8, and 9.

As may best be understood from FIGS. 6, 7, and 8, the tray apparatus 500 includes a base frame preferably made of square tubing. The base frame includes a pair of longitudinally extending side tubing members 502 and 504. Extending laterally between the longitudinal side tubing members 502 and 504 are three cross members. There is a front cross member 506, a cross member 508, which is disposed slightly rearwardly of the cross member 506, and a rear cross member 510. The cross member 508, for structural purposes, is disposed beneath or adjacent to the rear of a built-in ice chest 578. The front of the ice chest 578 is disposed over the front cross member 506. Obviously, another cross member may be used if required or desired. The additional member(s) would be between the members 508 and 510.

It will be noted that the 'front' of the tray apparatus 500 refers to the portion of the tray apparatus which is most easily accessible, and which is used first in moving the tray apparatus out of the frame 40. Accordingly, the 'front' of the tray apparatus 500 is actually disposed at the rear of the frame 40 and at the rear of the bed 6 of the vehicle 2. Obviously, if desired, the tray apparatus 500 may be referred to in keeping with the traditional, general terminology of the vehicle in which it is disposed, just as the frame 40 has been. However, for convenience herein, the 'front' of the tray apparatus 500 is that portion which extends outwardly from the vehicle and is first contacted in order to use the tray apparatus.

At the bottom of the side tubing members 502 and 504 are four cutout areas which receive wheel assemblies. In FIG. 6, four wheels extending downwardly from the side frame member 502 are shown. The wheels include a wheel 512, a wheel 514, a wheel 516, and a wheel 518. The wheel 512 is also shown in FIG. 8, and the wheel 518 is also shown in FIG. 7. In addition, there are four wheels on the opposite side of the tray apparatus 500 from the wheels 512, 514, 516, and 518. The wheels include a wheel 520, shown in FIG. 8. The wheel 520, and its three companions, are substantially parallel to the respective wheels 512, 514, 516, and 518. The axles for all eight wheels are appropriately secured to the side tubing members 502 and 504 so that the wheels extend downwardly below the tubing members and roll on the bed 6 of the pickup 2. It will be known and understood that the beds of pickup trucks are generally ribbed with longitudinally extending ribs. The eight wheels extend beneath the frame of the tray apparatus 500 and roll between or on the ribs of the pickup bed.

The side frame members 502 and 504 are appropriately secured, as by welding, to the cross or transverse frame members 506, 508, and 510. The five separate frame members comprise a base for the tray apparatus 500.

A tray bottom 530 is disposed on top of the frame members, and is appropriately secured thereto. The tray bottom 530 may be plywood, plastic, fiberglass, or the like, as desired. Plywood is a relatively strong material used in construction, and is generally readily available.

Extending upwardly from the tray bottom 530 is a plurality of side members. The side members include a side 536, shown best in FIG. 1, and in FIGS. 6, 7, and 8. The side 536 extnds upwardly from the frame member 502 and is generally rectangular in configuration and extends for the full height of the tray apparatus 500. At the opposite side of the tray apparatus 500 is a second side, but the side is not a continuous side, as is the side 536. Rather, there are three separate side members, including a rear side member 540, a low side member 542, and another full height side member 544. The side member 542 is relatively low. The side members 540 and 544 are full height. However, they vary in their length so as to define different sized compartments, as will be discussed below. The side member 544 is spaced apart from the side member 542. The side member 544 is shown only in FIG. 8.

To separate the tray apparatus 500 into several compartments, there is a center partition 550 which extends the length of the tray rearwardly from the ice chest 578. The partition 550 is substantially parallel to the side member 536, and also the side members 540, 542, and 544. The center partitions 550 extends longitudinally with respect to the tray bottom 530 and rearwardly from the ice chest 578 to a rear end panel 572. The center partition 550 is full height, or substantially the same height as the side panel 536, and the opposite full height side panels 540 and 544.

At the front of the tray apparatus 500 is a front panel 552. The panel 552 extnds for the full width of the tray apparatus 500, and upwardly from the bottom 530. The front panel 552 also defines the front of the ice chest 578. Parallel to the front panel 552, and extending between the side panels 536 and 544, is a panel 554. The panel 554 defines the rear outside wall of the ice chest 578. The panel 554 is full height, and extends upwardly from the tray bottom 530 between the side panel 536 and the rear of the side panel 544. The ice chest 578 is defined by the front portion of the side panel 536, the full length of the side panel 544, the front panel 552, and the panel 554. The tray bottom 530 defines the bottom of the ice chest.

The center partition 550 extends rearwardly from the panel 554 to the rear or end panel 572.

The tray apparatus 500 includes the two center partitions which extend between the side panel 536 and the center partition 550. The partitions include a partition 556 and a partition 564. The partitions 556 are full height, or substantially the same height as the outer side panel 536 and the partition 550. They divide the space between the panel 536 and the center partition 550 rearwardly of the ice chest 578 to the rear end wall or panel 572 into three separate compartments. The three compartments include a front compartment 558, a center compartment 566, and a rear compartment 576. The end panel 572, extends upwardly from the tray bottom 530 and it extends the full width of the tray apparatus 500, just as does the front panel 552. Both panels 552 and 572 are appropriately secured to the side panels 536, 544 and 536, 540, respectively. The side panels and end panels are also secured to the frame members.

On the opposite side of the center partition 550 from the compartments 558, 566, and 576, there are two full height partitions, including a partition 560 and a partition 568. The partition 560, together with the center partition 550 and the panel 554, define a stove compartment 562. The bottom of the stove compartment 562 is, of course, the tray bottom 530.

It will be noted that the compartment 562 is enclosed on only three sides, namely by the partition 554, the partition 550, and the partition 560. The compartment 562 does not include an outer wall so that complete access is provided to a camp stove which may be disposed in the compartment 562. Thus access to compartment 562 is without the impediment of any kind of a rail or panel, except for a side board 600, which will be discussed below. The down position of the side board 600 is shown in FIG. 1. With the side board 600 up, a camp stove disposed within the compartment 562, such as shown in FIG. 2, is enclosed on four sides.

The partitions 560 and 568, together with the center partition 550 and the relatively short wall 542, define the compartment 570. The relatively short wall 542 provides relatively easy access to the compartment 570 for, for example, the storage of small items and/or stacking of trays, plastic containers, plastic basins, etc.

A compartment 574 is defined within the panel 550, the panel 568, the panel 540, and the panel 572. The compartment 574 is full height, but, as shown in FIG. 1, the length of the compartment 574 is less than the length of its aligned compartment 576.

As best shown in FIG. 1, the six open top compartments, including the compartment 558, the stove compartment 562, the full height compartment 566, the low side compartment 570, and the full height compartments 576 and 574 all differ in size. Obviously they may be configured as desired by a particular user. The different sizes of the compartments allow for the storage or placement of different types and sizes of items therein. Obviously, for a specific user, the compartments may be configured to virtually any desirable size to accommodate various types of articles, such as a camp stove in the compartment 562.

As shown in FIGS. 6, 7, and 8, the ice chest 578 is appropriately insulated on five sides, or on four sides and a bottom, by appropriate insulation 580. On the inside of the insulation 580 is a shell 582.

A lid 584 is appropriately secured to the panel 554 by a hinge 588. For illustrative purposes, the hinge 588 is shown as a full length piano type hinge. Obviously, any appropriate type of hinge may be used.

The lid 584 includes appropriate insulation 586, which is preferably the same type of insulation as the insulation 580. The lid 584 and the shell 582 define an insulated compartment 590. The insulated compartment 590 may be drained by an appropriate drain 592 shown in FIG. 6. Also, the lid 584 may be appropriately secured to the front panel 552 by a hasp or clasp, or other means, as desired.

As shown in FIG. 1, there are two sideboards, including a sideboard 600 and a sideboard 610, which extend substantially the full length of the tray apparatus 500. They also extend the full height of the tray apparatus 500 in their up or closed position. The side boards 600 and 610 are appropriately secured to the side panels, as by hinges, (not shown). In the down position of the side boards, supporting leaves or the like are used to suspend the side boards at substantially ninety degrees to the side panels. Supporting leaves 602 and 604 are shown extending between the outer (top) edge of the side board 600 to the end panels 572 and 552, respectively. For the side board 610, two supporting leaves 612 and 614 are shown extending from the outer (top) edge of the side panel or side board 610 to the end panels 552 and the panel 572, respectively.

As a practical matter, the side board 600 serves as a work counter on one side of the tray apparatus 500, and the side board 610 serves as an eating table, or the like. Obviously, both side boards may be used as eating spaces and both may be used a work spaces, as desired.

Lock brackets 620 and 622, pivoting respectively on the partitions 560 and 556, are used to lock the panels 600 and 610, respectively, in their up position.

A handle or pull 553 is secured to the front panel 552, for convenience in moving the tray 500. The handle or pull 553 is centered on panel 552 between the sides 536 and 544.

Also secured to the front panel 552 are brackets 630 and 640. The brackets are generally U shaped and elongated. Disposed within the brackets are tubes secured by pivot pins. Within the bracket 630 is a tube 632. The tube 632 is secured to the bracket 630 by a pivot pin 634. The pivot pin 634 is generally toward the top or upper portion of the tube 632 and the bracket 630.

Within the bracket 640 is a tube 642. The tube 642 is secured to the bracket 640 by a pivot pin 644. The pivot pin 644 is adjacent to the top of both the tube 642 and the bracket 640.

A lock plate 650 is disposed adjacent to the bracket 630, and a lock plate 660 is disposed adjacent to the bracket 640. The lock plates 650 and 660 include movable lock pins which extend in one position through their respective adjacent brackets and tubes and in another position into the vertical frame members 44 and 54, respectively, of the frame 40 for securing the tray 500 to the frame 40, and accordingly to the pickup 2 when the tray 500 is in its inner, nested, position. When the tray is to be moved outwardly from the frame 40, the lock pins of the lock plates are moved inwardly from the tray locking position. The lock pins may then extend through their adjacent brackets and tubes to lock the tubes and a leg frame within the tubes together. This secures tubes and the leg frames to the tray 500.

In FIG. 8, the lock plate 650 is shown adjacent to the bracket 630. The lock pin 652 is shown extending outwardly beyond the side board 600, to lock the entire tray 500 to the frame 40 and the pickup 2. In dotted line, the lock pin 652 is shown extending through the bracket 630 and the tube 632. In FIG. 7, the lock pin 652 is shown extending into the frame member 44.

In FIG. 2, two leg frames, an upper leg frame 670, and a lower leg frame 680, are shown telescopingly secured together, with the upper leg frame 670 in turn telescopingly secured to the tubes 632 and 642. The upper leg frame 670 includes a pair of vertically extending and spaced apart tubular members 672 and 674. A cross member 676 secures the two tubular members 672 and 674 together. The upper portion of the tubular member 672 extends upwardly into the tube 632 of the bracket 630. The tubular member 674 extends telescopically upwardly into the tubular member 642 of the bracket 640.

The lower leg frame 680 includes a pair of spaced apart generally parallel tubes 682 and 684. A cross member 686 extends between the tubular members 682 and 684. The tubular members 682 and 684 telescopingly receive the lower portions of the tubular members 672 and 674, respectively, of the upper leg frame 670. The tubular members 672 and 674 include a plurality of apertures which allow the tubular members 672, 674, and 683, 684 to be adjusted relative to each other to various heights. The tubular members are conveniently pinned together at the appropriate heights.

At the bottom of the lower leg frame 680 is a lower cross member which comprises an axle 688. Wheels 690 and 692 are secured to the outer ends of the axle 688 at the lower portion of the tubular members 682 and 684, respectively.

The wheels 690 and 692 allow the tray 500 to roll outwardly form the pickup once the wheel frames have been secured to the brackets 630 and 640. As indicated above, the lock pins 652 and 662 are used to secure the tubes 632 and 642, and the upper tubular members 672 and 674 of the upper leg frame 670 to the brackets 630 and 640, respectively, to provide a unitary wheel assembly for the tray 500. Thus, once the front panel 652 has cleared the tailgate of the pickup, the leg assembly, consisting of the upper leg frame 670 and the lower leg frame 680, as secured thereto, are secured to the tubular members 632 and 642 to support the front end of the tray 500.

When the tray 500 is to be moved outwardly from the bed 60 of the pickup truck 2, the lock pins 652 and 662 are moved to unlock the tray 500 from the vehicle 2. Then, when the front panel 552 has cleared the truck 2, and particularly the tailgate 12 (see FIG. 1) of the pickup truck 2, the upper portions of tubular members 672 and 674 of the upper leg frame 670 may be secured to the tubular members 632 and 642 of the brackets 630 and 640, respectively, by the lock pins 652 and 662. The lower leg frame 680 may be appropriately secured to the upper leg frame 670.

As the tray is moved outwardly to its full position, the leg assembly supports the front end of the tray and also allows the front end to move smoothly on the wheels. As the tray 500 rolls outwardly, the roller wheels on the base frame sequentially clear the bed 6 of the pickup. Finally, only the wheel 518 (see FIG. 6) and its parallel, companion wheel (not shown) support the rear end of the tray 500 either from adjacent to the rear end of the pickup bed 6, or from the tailgate.

When the tray 500 is in its full out position, the side boards 600 and 610 may pivot ninety degrees outwardly and downwardly to comprise the work table and eating table, etc., as desired. Obviously, the rear end of the tray 500 must be supported on the vehicle in some fashion, preferably by the tailgate 12 or directly on the bed 6.

It will be noted that in the discussion of the tray 500, the panel 552 is considered as the 'front' of the tray. However, with respect to the frame 40 and the platform 200, the ends of the frame 40 and the platform 200 adjacent to the cab 4 of the pickup truck 2 are considered as the 'front' portions, while the portions of the frame 40 and the platform 200 adjacent to the rear end of the pickup 2 are considered as the rear end of the frame 40 and the platform 200. The difference or distinction in the terminology is simply that the frame 40 and the platform 200 remain relatively fixed with respect to the vehicle 2, but the tray 500 moves relative to the vehicle 2. Accordingly, the 'front' of the tray 500 is that portion of the tray which moves outwardly from the frame, and thus is the portion that is first grasped by a user, etc. The 'rear' of the tray 500 is in the portion that is farthest from the front, or the last portion of the tray to move outwardly from the frame 40.

FIG. 9 is a fragmentary perspective view of a portion of the tray apparatus 500, illustrating an alternate embodiment of a portion of the tray apparatus 500. The side board 536 is shown, and two drawers 594 and 596 are shown extending into the tray from the side 536. The front or outer portions of the drawers 594 and 596 are also shown in dotted line in FIG. 1.

As shown in FIG. 1, the drawers 594 and 596 are disposed adjacent to the insulated compartment 590, and extend into compartment 558. Obviously, if desired, the drawers could be used with any compartment, as desired.

If drawers are included in the tray apparatus 500, it may be advantageous to have a top 598 on the compartment in which the drawers are disposed for added protection from dust, etc.

FIG. 10 is a side view in partial section illustrating an alternate or additional use of the leg frames 670 and 680. The leg frames 670 and 680 may be used as a hand truck or dolly for transporting various items, such as wood, or even a person, by connecting frame extensions to the upper tubular members, by extending the upper and lower frames 670 and 680 to their maximum height, and by adding a lower carrying plate assembly 700.

The carrying plate assembly 700 includes a carrier plate 702 secured to a bracket 704 which fits over the axle 688. A back plate or strap 706 extends for the bracket 704 upwardly to the cross member 686. The plate or strap 704 then terminates in a top bracket 708 which hooks over the cross member 686.

In FIG. 10, the side extension member 90 is shown disposed on the tubular member 672, and the two elements may be appropriately secured together by a bolt or screw and a wing nut, or the like.

The tray apparatus 500 is of a generally rectangular configuration. The four sides of the apparatus, including the side panel 536, the aligned side panels 540, 542, and 544, the front side panel 552, and the rear end side panel 572, along with the side boards 600 and 610, and the bottom panel 530, comprise the basic rectangular configuration.

Except for the ice chest 578, and possibly a cover 598 on a drawer compartment, the compartments are open on top. Also, some of the compartment sides may have varying heights. However, such features do not detract from the basic rectangular configuration.

The tray apparatus 500 has been discussed in terms of roller wheels on the bottom for moving (rolling) the tray apparatus in and out. If desired, a track system (not shown) may also be used. However, a track system would require affixing part of the track system to the floor or bed of a vehicle, and thus may or may not be advantageous.

If the tray apparatus were shorter than illustrated herein, a track system may be advantageous. For example, for a relatively short tray, the use of a track system may obviate the use of the front leg frame system with the wheels 690 and 692, since the track system may provide the support for the tray apparatus. However, a disadvantage in using a track system without a front wheel frame system is that it would be rather difficult to compensate for parking a vehicle on a slope.

The sideboards 600 and 610 are illustrated as extending substantially the entire length of the apparatus. If desired, they may both be shorter, or one of them may be shorter.

While the lengths of the sideboards may be varied, their height, when disposed or oriented against the side panels, and which, when they are moved relative to the side panels to their functional orientation, becomes their width, is limited to the overall height of the frame within which the apparatus is nested.

For convenience, the insulated compartment or ice chest 578 is located at the front of the tray apparatus 500. Obviously, it may be located as desired by a user. For example, it may be preferable to have a drawer compartment at the front, or to have the stove compartment at the front. Such design choices may be appropriately made by a user.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Tray apparatus for a vehicle, comprising, in combination:
   frame means disposed in the vehicle, including
   a first base stringer,
   a second base stringer spaced apart from, and substantially parallel to, the first base stringer.
   first vertical frame means secured to the first base stringer,
   second vertical frame means secured to the second base stringer,
   cross member means secured to and extending between the first and second vertical frame mans,
   extension means secured to the cross member means for extending the width of the frame means,
   longitudinal frame means secured to the cross member means, and
   platform means disposed on the cross member means and on the longitudinal frame means, and including a first portion and a second portion, and the second portion is disposed on the extension means and is removable for providing access beneath the extension means; and
   tray means disposed within the frame means in a nested position and movable to an outer position from within the frame means, including
   bottom means,
   panel means extending upwardly from the bottom means,
   partition means secured to the panel means and defining with the bottom means and the panel means a plurality of storage compartments,
   side board means pivotable from an up position adjacent to a portion of the panel means to a down position when the tray means is moved outwardly from within the frame means to comprise a work and eating area, and
   wheel means secured to the panel means for supporting the bottom means and the panel means as the tray means moves and while the tray means is in its outer position.

2. The apparatus of claim 1 in which the extension means is adjustable to vary the width of the frame means.

3. The apparatus of claim 2 in which the extension means includes a first plurality of side extensions and a second plurality of side extensions, and the second portion of the platform means is disposed on the first plurality of side extensions for providing access beneath the first plurality of side extensions.

4. The apparatus of claim 3 in which the platform means further includes a third portion, and the third portion is removably disposed on the second plurality of side extensions for providing access beneath the second plurality of side extensions.

5. The apparatus of claim 1 in which the tray means includes lock means for securing the tray means to the frame means when the tray means is in its nested position.

6. The apparatus of claim 5 in which the panel means includes a first end panel, and the wheel means is secured to the first end panel.

7. The apparatus of claim 6 in which the lock means is secured to the first end panel and cooperates with the wheel means to secure the wheel means to the first end panel.

8. The apparatus of claim 1 in which the frame means further includes front extension means for extending the length of the frame means.

9. The apparatus of claim 8 in which the front extension means includes first and second socket means secured to the first and second vertical frame means.

10. The apparatus of claim 9 in which the front extension means further includes first and second front extension members securable to the first and second socket means for extending the length of the frame means.

11. The apparatus of claim 9 in which the front extension means further includes front frame means securable to the first and second socket means for extending the length of the frame means.

12. The apparatus of claim 1 in which the wheel means includes bracket means secured to the panel means and wheel frame means removable securable to the bracket means.

13. The apparatus of claim 12 in which the wheel frame means includes at least a single wheel.

14. The apparatus of claim 13 in which the wheel frame means further includes an upper frame and a lower frame, and the upper and lower frames are adjustable relative to each other to vary the length of the frame means.

15. The apparatus of claim 14 in which the wheel frame means further includes carrying means for carrying items when the wheel frame means is removed from the bracket means.

16. Tray apparatus for a vehicle, comprising, in combination:
   bottom means;
      end means secured to the bottom means and extending upwardly to comprise ends for the tray apparatus;
   side means secured to the bottom means and extending upwardly to comprise sides for the tray apparatus;

17. The apparatus of claim 16 in which the means for moving the tray apparatus includes a plurality of wheels secured to the bottom means.

18. The apparatus of claim 16 in which the compartment means includes a plurality of partitions secured to the side means and to the bottom means for defining the plurality of compartments.

19. The apparatus of claim 18 in which the compartment means further includes an insulated compartment.

20. The apparatus of claim 16 in which the side means includes a plurality of panels including portions having different heights.

21. The apparatus of claim 16 in which the means for moving the tray apparatus includes wheel means for supporting the tray means outwardly from the vehicle.

22. The apparatus of claim 21 in which the wheel means includes a bracket means secured to the side means and tubular means removably securable to the bracket means.

23. The apparatus of claim 22 in which the tubular means includes a lower portion having at least a single wheel secured thereto and an upper portion securable to the bracket means.

24. The apparatus of claim 23 in which the tubular means further includes carrying means for carrying items when the frame means is removed from the bracket means.

25. Tray apparatus for a vehicle, comprising, in combination: tray means, including
   a bottom for supporting items, and
   sides secured to and extending upwardly from the bottom;
   means for moving the tray means relative to the vehicle;
   wheeled support means securable to and removable from the tray means for supporting the tray means outwardly from the vehicle, including
   first leg means comprising a first support for the tray means,
   a first wheel secured to the first leg means,
   second leg means comprising a second support for the tray apparatus,
   a second wheel secured to the second leg means,
   cross member means secured to the first and second leg means for securing the first and second leg means together; and
   carrying means secured to the wheeled support means for carrying items when the wheeled support means is removed from the tray means.

26. The apparatus of claim 25 in which the carrying means includes a carrying plate and a bracket, and the bracket is removably securable to the cross member means.

27. The apparatus of claim 25 which includes bracket means for removably securing the wheeled support means to the tray means.

* * * * *